United States Patent [19]

Chang

[11] Patent Number: 6,040,550
[45] Date of Patent: Mar. 21, 2000

[54] APPARATUS AND METHOD FOR LASER WELDING THE OUTER JOINTS OF METAL BELLOWS

[76] Inventor: Dale U. Chang, 2900 Sun Bittern Ct., Windermere, Fla. 34786

[21] Appl. No.: 08/921,292

[22] Filed: Aug. 29, 1997

Related U.S. Application Data

[60] Provisional application No. 60/029,823, Oct. 28, 1996.

[51] Int. Cl.[7] ................................................. B23K 26/00
[52] U.S. Cl. .............................. 219/121.63; 219/121.64; 219/121.83
[58] Field of Search ....................... 219/121.63, 121.64, 219/121.83; 364/474.08; 700/166; 29/454

[56] References Cited

U.S. PATENT DOCUMENTS

| | | | |
|---|---|---|---|
| 2,534,123 | 12/1950 | Hasselhorn | 29/454 |
| 3,626,582 | 12/1971 | Melill | 29/454 |
| 3,918,622 | 11/1975 | Larsen | 228/8 |
| 4,231,824 | 11/1980 | Cooper . | |
| 4,429,211 | 1/1984 | Carstens et al. | 219/121.63 |
| 4,644,129 | 2/1987 | Miller . | |
| 4,700,045 | 10/1987 | Merry et al. | 219/121.8 |
| 4,760,236 | 7/1988 | Stoll . | |
| 4,766,285 | 8/1988 | Decailloz et al. . | |
| 4,998,005 | 3/1991 | Rathi et al. . | |
| 5,001,324 | 3/1991 | Aiello et al. . | |
| 5,026,967 | 6/1991 | Bell et al. . | |
| 5,045,668 | 9/1991 | Neiheisel et al. . | |
| 5,053,601 | 10/1991 | Landtwing et al. . | |
| 5,155,322 | 10/1992 | McClellan et al. . | |
| 5,168,141 | 12/1992 | Tashjian et al. . | |
| 5,410,123 | 4/1995 | Rancourt . | |
| 5,478,983 | 12/1995 | Rancourt . | |
| 5,607,605 | 3/1997 | Musasa et al. | 219/121.64 |
| 5,674,415 | 10/1997 | Leong et al. | 219/121.83 |

OTHER PUBLICATIONS

Six Reasons for InstaMark, Laser Applications, Inc., Dale U. Chang, Feb. 22, 1994, pp. 1–4.

*Primary Examiner*—Geoffrey S. Evans
*Attorney, Agent, or Firm*—James H. Beusse; Holland & Knight LLP

[57] ABSTRACT

A laser welding machine includes an arbor for rotating a plurality of bellows diaphragms positioned together in side-by-side relation adjacent the laser. An optical tracker is provided for optically tracking a position of a rotating outer joint of the diaphragms as the arbor rotates. In addition, a low inertia beam steering mechanism is used for directing the laser beam to form a weld in the rotating outer joint responsive to the optical tracker. The laser may be an Nd:YAG, a diode laser, or carbon dioxide laser, for example. The optical tracker preferably includes a solid state camera and an illumination source positioned on opposite sides of the rotating outer joint to capture a shadow image of the joint. The welding machine may further include a processor and associated display operatively connected to the camera and to the beam steering means. The display may be used for displaying the shadow image of the rotating outer joint. The laser beam may be aligned horizontally, and indexing of joints and distance positioning for focusing the laser beam provided by an X-Y table.

61 Claims, 4 Drawing Sheets

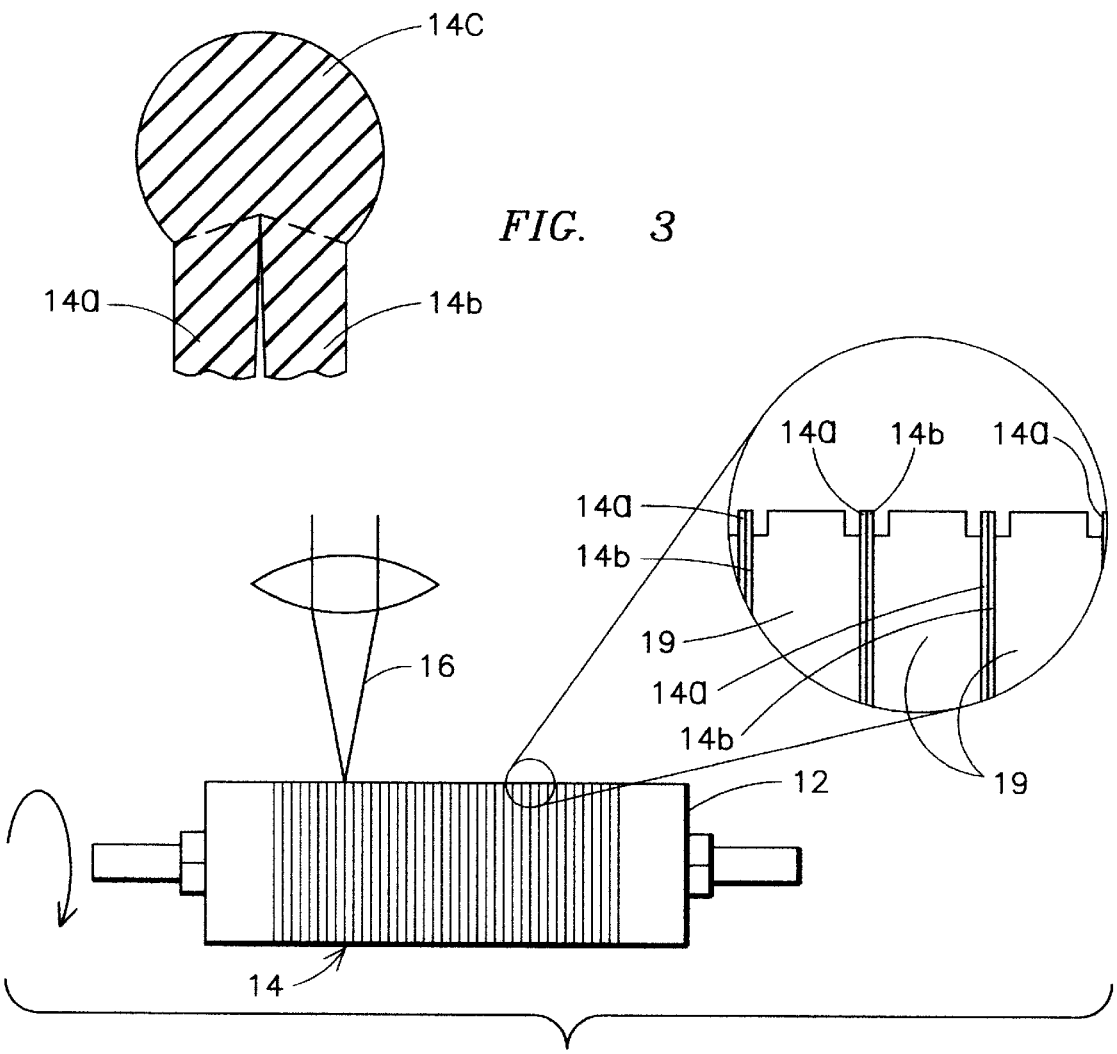
FIG. 3
FIG. 2
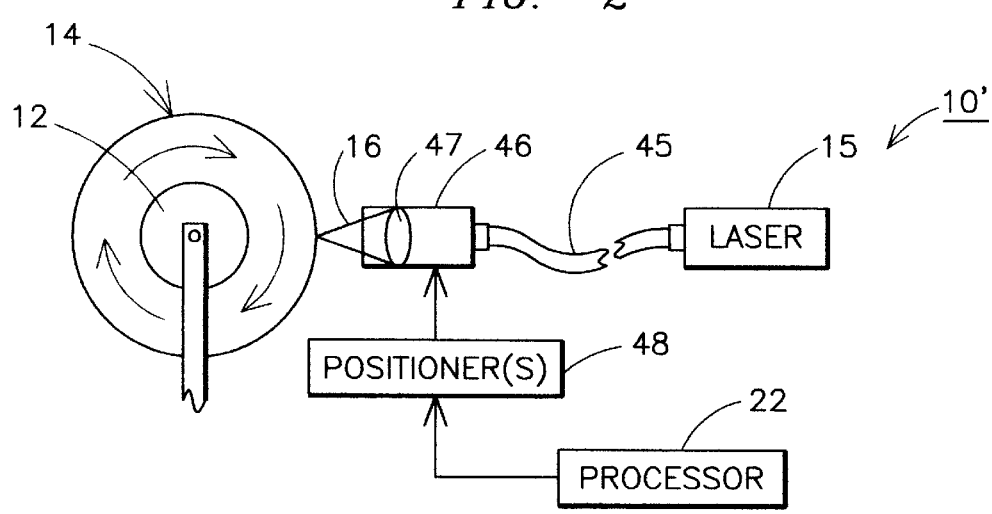
FIG. 6

FIG. 5

| Part Number: | NEW | Limit: 1:00–14:00 |
|---|---|---|
| Outside Diameter (Inch)<br>Material<br>Tknss (Diaphragm)<br>Tknss (Spacer)<br>Tknss (Guide) (Inch)<br># of Weldments<br>** | Laser Power (Amp)<br>WLD Speed (CNV)<br>WLD Speed (Guide) (IPM)<br>Overlap<br>Table X Offset<br>Y Offset<br>Beam Z Position (Inch)<br>** ~23" | Power Ramp<br>Up: Init. Power (% of Lsr Pwr)<br>Up: Rising Time (Second)<br>Dn: Ending Power (% of Lsr Pwr)<br>Dn: Decay Tm(s)<br>Gas Purge Delay<br>Gas Off Delay (Second) |
| Power Program: | | |
| WLD Seq. | | |
| NOTE | | |

[F2] – Save and exit    [ESC] – Exit

APPARATUS AND METHOD FOR LASER WELDING THE OUTER JOINTS OF METAL BELLOWS

RELATED APPLICATION

This application is based upon prior filed copending provisional application Ser. No. 60/029,823 filed Oct. 28, 1996.

FIELD OF THE INVENTION

The present invention relates to the field of precision manufacturing, and, more particularly, to an apparatus and method for forming metal bellows using laser welding.

BACKGROUND OF THE INVENTION

Precision metal bellows are widely used in a number of applications where movement is required, but where sealing is also desired. For example, where it is desirable to have a vacuum on the exterior or interior of the bellows, the bellows provides environmental sealing. In other words, a bellows may be used as a boot for protective sealing. A bellows may also be used as a mechanical actuator by controlling pressure within the bellows, for example.

A bellows may be formed by joining together a series of bellows diaphragms in a predetermined pattern. A typical diaphragm is a generally circular disk with concentric folds formed therein. The diaphragms are joined together so that adjacent inside edges are connected together and adjacent outside edges are connected, etc.

The conventional approach to joining the diaphragms has been to tungsten inert gas (TIG) weld both the inside and outside joints. Unfortunately, TIG welding is relatively slow and may produce inconsistent quality welds.

In general, in TIG welding a pair of diaphragms are positioned in side-by-side relation and the interior weld is first formed using an inside diameter welding machine. Once a sufficient number of welded pairs or convolutions are made, these are assembled and positioned on a spindle or arbor. Copper "chill rings" or spacers are positioned between opposing outer portions. The chill rings help control the heating and heat dissipation of the diaphragms. The assembled convolutions and chill rings are rotated on the arbor, and each outer seam is TIG welded. The arc welding torch is indexed to each of the seams for welding. An operator watches the welding arc through a stereo microscope for alignment before and during welding. This operation may be very tedious for the operator. Moreover, the outcome of the bellows depends largely on the skills, experience, acuity, attentiveness, and the physical condition of the operator.

Once the outer welds are completed the structure is removed from the arbor, and the copper chill rings are then removed and discarded. Unfortunately, the copper chill rings must be made to relatively exacting tolerances and are therefore relatively expensive. Moreover, once used the copper rings are discarded, and new rings must be supplied and used for making the next bellows. Accordingly, the cost of manufacturing is increased because of the cost of the copper chill rings.

Precision metal bellows manufacturing has been relying on gas tungsten arc (GTAW) or TIG welding for metal bellows for the past 20 years. Many improvements have been made to the process including power control, pulsing techniques and torch configuration. Unfortunately, the conventional arc welding process has inherent limitations in terms of productivity and quality. The welding speed is relatively slow (10–20 inches per minute) and the weld quality degrades as the welding tip wears out. Constant adjustments and finesse are needed to maintain the weld quality. In addition, the weld quality depends largely on the skill and the acuity of the operator. The process is labor intensive and is not well suited for automation. The costs of disposable and consumable items are also high.

U.S. Pat. No. 3,918,622 to Larsen discloses tungsten inert gas (TIG) welding of the outer joint of a plurality of stacked diaphragms and with optical tracking of a weld immediately following the formation thereof to maintain precise torch alignment with the weld joint. The diaphragms to be welded are stacked on a rotatable arbor. A radiation source such as a lamp, is focused by a lens and directed by a mirror to the seam. Reflected light from the seam is sensed by two side-by-side phototransducers so that a difference in the two output signals indicates the lateral displacement of the seam. Unfortunately, the split photosensor system described may not accurately indicate the position of the relatively small seams of many commercially desirable bellows.

Also relating to joining diaphragms to form a metal bellows, U.S. Pat. No. 3,626,582 to Melill discloses diffusion bonding for the stacked diaphragms. The fabrication requires pressuring fixture tooling including an external steel cylindrical retainer ring and an internal steel cylindrical retainer plug, together with a force transmitting annular ram and multiple thin steel pressure support rings using to transmit the bonding forces of the high pressure ram. The process, unfortunately, is relatively complicated and expensive at it requires elevated temperatures of 1600–1700 degrees F. at 500 PSI pressure for 5 hours for typical thin sheet metal titanium diaphragms.

Laser and electron beam apparatus have also been disclosed for welding the joints of metal bellows. For example, U.S. Pat. No. 4,760,236 to Stoll discloses a laser welding apparatus wherein the outer diameter welds are made one at a time to form pairs of diaphragms. The pair of diaphragms are pressed between opposing tooling fixture portions to ensure alignment. To form the inner welds, a series of pairs are positioned within an evacuated chamber and the laser beam is directed through the center opening to the inner weld positions. For both the inner and outer welds, the laser beam is directed at an oblique angle. Unfortunately, an oblique angle may cause a nonsymmetrical and low quality weld. Moreover, precise positioning of the laser beam for the inside welds may be difficult and result in poor quality welds.

U.S. Pat. Nos. 5,478,983 and 5,410,123 both to Rancourt disclose an apparatus for forming a bellows bladder using a laser beam to form the inner and outer welds. An oblong shaped laser spot is used for welding. In addition, a comb structure is used to separate and position interior joints and exterior joints for laser welding. Precise relative positioning requires high accuracy of the comb and little or no variations in the convolutions. In short, precise positioning of the laser beam relative to the weld areas may be difficult to achieve.

SUMMARY OF THE INVENTION

In view of the foregoing background, it is an object of the present invention to provide an apparatus and associated method for providing high quality welds or joints for manufacturing metal bellows.

It is another object of the present invention to provide an apparatus and associated method for providing high quality welds or joints for the outer seams of metal bellows and while having a relatively rapid production rate.

These and other objects, features and advantages of the present invention are provided by a laser welding apparatus including an arbor for rotating a plurality of bellows diaphragms positioned together in side-by-side relation adjacent the laser; optical tracking means for optically tracking a position of a rotating outer joint of the diaphragms as the arbor rotates; and beam steering means for directing the laser beam to form a weld in the rotating outer joint responsive to the optical tracking means. The laser may be an Nd:YAG laser, a diode laser or carbon dioxide laser, for example. The optical tracking means preferably comprises a camera to capture an image of the rotating outer joint. More preferably, the optical tracking means preferably comprises a solid state camera and an illumination source positioned on opposite sides of the rotating outer joint to capture a shadow image of the joint.

The apparatus may further include a processor and associated display operatively connected to the camera and to the beam steering means. The display may be used for displaying the shadow image of the rotating outer joint. In addition, a vision camera may be positioned to capture the image of the rotating joint after welding so that this image is indicative of weld quality and may be used to control laser power.

The apparatus may also include indexing means for axially positioning the arbor to present a plurality of successive outer joints to the laser beam. Accordingly, the indexing means may step through each of the outer joints to be welded for the bellows. In addition, the spacing between the laser and the outer joints may be controlled to thereby effect laser focus and also account for different sized diaphragms. In one embodiment, the laser beam may be aligned horizontally, and the indexing and distance positioning provided by an X-Y table.

The beam steering means may include means for steering the laser beam to impinge the rotating joint substantially normal thereto, such as within 30 degrees from a mating surface between adjacent bellows diaphragms. Thus, a high quality symmetrical weld may be formed. The beam steering means preferably comprises at least one galvanometer and an associated optical element, such as a mirror, or prism connected to the galvanometer; and a laser beam focusing lens in the optical path either upstream or downstream from the galvanometer. Alternately, the beam steering means may be provided by a positionable beam directing or focussing head connected to the laser by a fiber optic cable. The head may include at least one lens for focussing the beam.

The apparatus may also preferably include a supply of inert gas, and delivery means for delivering the inert gas to the exterior and interior weld areas. In addition, a series of chill rings or spacers may be positioned between adjacent pairs of diaphragms.

The processor of the apparatus may also include means for storing and permitting recall of a part identification, such as a part number, along with associated welding parameters. For example, the welding parameters may include a welding schedule, position information, etc. In other words, the processor permits the operator to recall information for welding based upon a part identification number.

A method aspect of the invention is for making a metal bellows of a type comprising a plurality of bellows diaphragms joined together. The method preferably includes the steps of: generating a laser beam; rotating a plurality of bellows diaphragms positioned together in side-by-side relation in a path of the laser beam; optically tracking a position of a rotating outer joint of the plurality of bellows diaphragms; and steering the laser beam for welding the rotating outer joint responsive to optically tracking a position of the rotating outer joint. The step of optically tracking preferably comprises capturing an image of the rotating outer joint, and, more preferably comprises providing illumination from an opposite side of the rotating outer joint from the capturing so that the captured image is a shadow image of the rotating outer joint.

BRIEF DESCRIPTION OF THE DRAWINGS

FIG. 2 is a side view of the rotating arbor of the apparatus as shown in FIG. 1, along with a greatly enlarged portion of several of the outer joints and associated chill rings.

FIG. 3 is a greatly enlarged cross-sectional view through the outer welded joint area of a pair of diaphragms as shown in FIG. 2.

FIG. 5 is another representative display screen of the personal computer of the apparatus as shown in FIG. 1.

FIG. 6 is a schematic block diagram of another embodiment of the laser beam steering portion of the apparatus in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
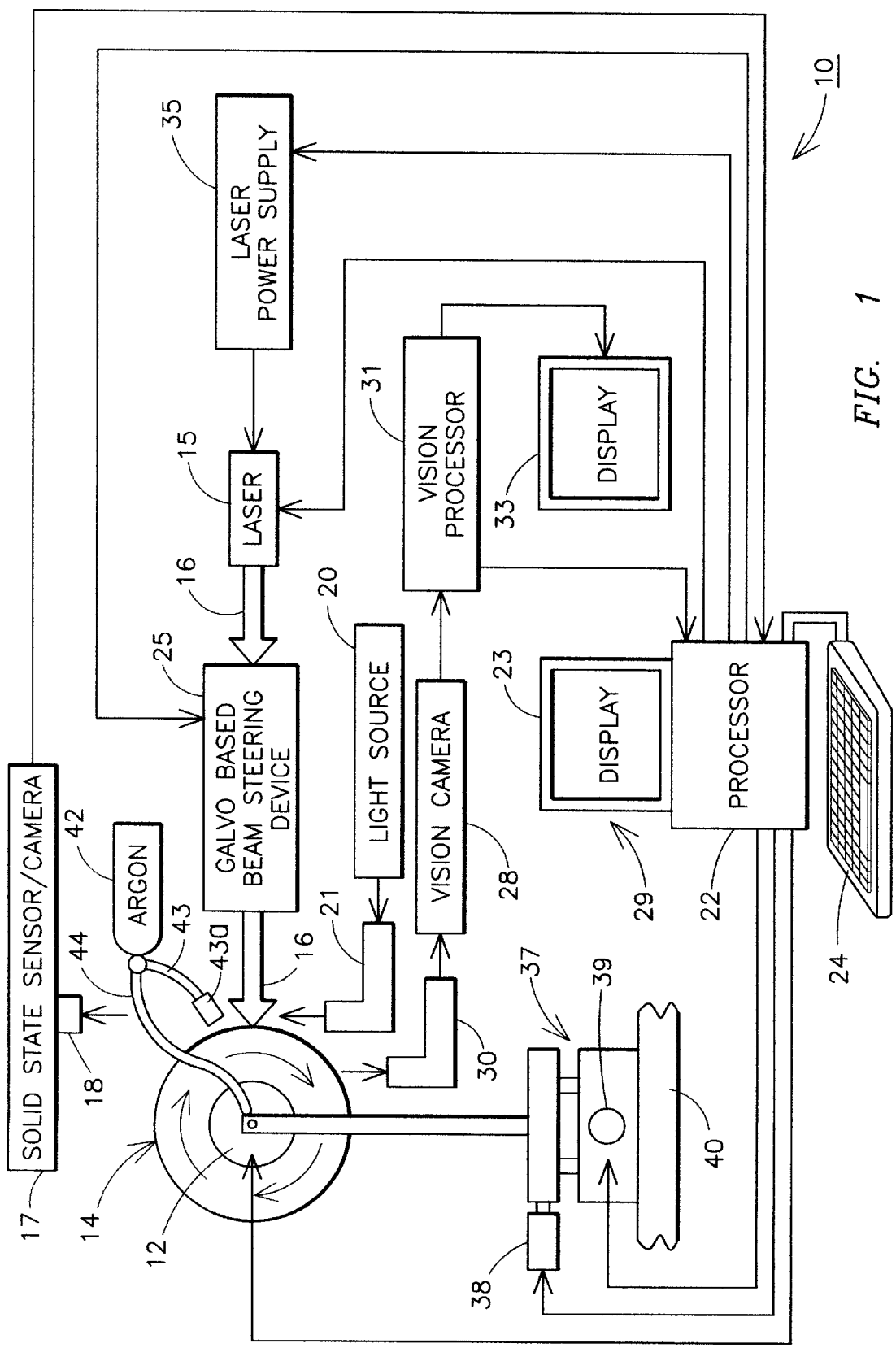
FIG. 1 is a schematic block diagram of the laser welding apparatus in accordance with the present invention.

Referring now initially to FIGS. 1 and 2, a laser welding apparatus 10 in accordance with the present invention is described. The illustrated apparatus 10 includes an arbor 12 for rotating a plurality of bellows diaphragms 14 positioned together in side-by-side relation adjacent a laser 15. The apparatus 10 can weld diaphragms 14 to guides, as well as diaphragms to diaphragms. Several bellows assemblies can be welded at one loading by skipping welding of intermediate seams as would be readily understood by those skilled in the art.

The arbor 12 may be rotated by a conventional lightweight lathe motor, as would also be readily understood by those skilled in the art. The laser 15 may be an Nd:YAG or carbon dioxide laser, or a diode laser, for example, coupled to the illustrated laser power supply 35. The laser welding may be performed with power densities in the range of 20,000 W/cm2 to 10,000,000 W/cm2 depending on the material and the welding speed. In addition, focusing optics may be used to elongate the laser beam 16 in the direction of weld or to form a double laser spot to improve weld appearance by increasing the beam-material interaction time (dwell time) at a given welding speed. In addition, the laser welding may preferably be in conduction mode rather than a key-hole mode, although the key-hole mode may be used in other embodiments of the invention.

As shown perhaps more clearly in the greatly enlarged portion of FIG. 2, the diaphragms 14 are arranged in pairs of opposing first and second diaphragms 14a, 14b, and with chill rings or spacers 19 between adjacent pairs of diaphragms. A pair of diaphragms 14a, 14b is also known as a convolution as would be readily appreciated by those skilled in the art. The chill rings 19 between adjacent diaphragms provide for the clamping of adjacent diaphragms and for the separation of molten metal from unwanted bridging to the adjacent diaphragms. The chill rings 19 may be copper and its alloys, or stainless steel as used in conventional TIG welding to form metal bellows and as would be readily understood by those skilled in the art. In addition, the chill rings 19 may be reusable plastic materials as described in copending patent application, having attorney work docket no. 18509, entitled "Apparatus and Method for Laser Welding the Inner Joints of Metal Bellows" to the present applicant, and the entire disclosure of which is incorporated by reference herein.

The laser 15 is a precisely controllable source of heat, and, since the laser is a non-contact and non-wear tool, it is highly reliable and consistent. The application of lasers to precision component manufacturing as for forming bellows has been seriously limited by the difficulties of accurately positioning the laser beam. Although the positioning of the beam to a predetermined absolute position may not be a serious problem if the parts to be welded are consistent and the fixture is accurate, for bellows welding multiple diaphragms are stacked together for consecutive welding and the problem of seam tracking multiplies due to accumulated errors. In other words, the weld seams tend to run away from the laser beam path due to the wobble of the seam as the loaded arbor 12 rotates in the path of the laser beam 16. The degree of the wobble may typically be too great to produce satisfactory welds all the way around the diaphragms without the precision seam tracking features of the present invention. Since the diaphragms 14 are stacked together for outer joint welding, the positioning problem becomes worse as the arbor indexes away from the initial welding position.

For successful laser welding of metal bellows, it was determined that the resolution of the precision seam tracker should be in the order of +/−0.0005" or better. For reference, the thickness of typically used diaphragms is in the range from 0.002" to 0.012". Of course, thicker diaphragms may also be welded. The desired system should also respond fast to adapt to a dynamic position variation. These characteristics required development of a precision, high fidelity seam tracking system as described below. The apparatus 10 is suited for a variety of bellows designs, including those with outside diameters ranging from 1" to 24", with any combination of chill rings or spacers and diaphragms, and a length of up to 24", for example. Of course, larger diameters and longer lengths can be accommodated by suitably sized lathes and tables, for example, Accordingly, the apparatus 10 further includes optical tracking means for optically tracking a position of a rotating outer joint of the diaphragms 14 as the arbor rotates. In addition, the apparatus 10 also includes beam steering means for directing the laser beam to form a weld in the rotating outer joint responsive to the optical tracking means. The optical tracking means is provided in part in the illustrated embodiment by a solid state camera 17 which captures an image of the rotating outer joint. The solid state camera 17 may be of a line scan or area scan type. In addition, the camera may be based upon various sensor technologies, such as a charge coupled device (CCD), a charge injection device (CID), a charge primed device (CPD), a charge coupled photodiode device (CCPD), self-scanned photodiodes (SSPD), and complementary metal oxide semiconductor (CMOS) devices, etc. as would be readily understood by those skilled in the art. A magnifying lens 18 is associated with the camera in the illustrated embodiment.

More preferably, the optical tracking means comprises a camera 17 and an illumination source positioned on opposite sides of the rotating outer joint to capture a back-lighted or shadow image of the joint. The illumination source is provided in the illustrated embodiment by a light source 20 and an associated optical element in the form of a mirror 21. Those of skill in the art will recognize that other optical elements, such as a prism, for example, may also be used in place of or in addition to the mirror 21. For example, the camera 17 and its associated lens 18 may have the following properties:

Magnification: 0.5× to 10×
Field of view (mm): 17.75–4.43 (or 19.0–2.96)
Working Distance (mm): 61 (or 95)
Video Data Rate (KHz): 20–20,000
Camera Scan Rate (lines/sec): 70,000
Spectral response (nm): 300–1,100
Resolution (mm): 0.0173–0.00433
Dimensions (mm): Camera=63.5×63.5×47, 285 g.
 Optics=154 L×27.9 D, 250 g.

The apparatus 10 may further include a processor 22 and associated display 23 operatively connected to the camera 17 and to the beam steering means. The beam steering means in the illustrated embodiment is provided by the galvanometer based steering mechanism 25 as would be readily appreciated by those skilled in the art. A focusing lens, not shown, may also be included, either upstream or downstream from the galvanometer based steering mechanism 25. For example, the galvanometer based steering mechanism 25 may be of type as is commonly used for laser engraving or marking as would also be readily understood by those skilled in the art.

Referring briefly to FIG. 6, another embodiment of a beam steering mechanism is explained. In the illustrated embodiment of the apparatus 10', the beam steering is provided by an optical fiber cable 45 connected between the laser 15 and a positionable focussing or beam directing head 46. The head 46, in turn, may carry a lens 47 for focussing the laser beam 16 to the rotating outer joint. The head 46 is positionable along one or more directions by the illustrated positioner(s) 48 of a conventional type, as would be readily appreciated by those skilled in the art. For example, the positioners may be provided by motors or other controllable positioners. The positioner(s) 48 may be controlled by the illustrated processor 22 as would also be readily understood by those skilled in the art. The beam directing or focussing head 46 is moved in response to a sensed deviation by the optical tracking system.

Returning again to FIG. 1, the processor 22 and display 23 may be part of a personal computer 29 and therefore further include the illustrated keyboard 24. The display 23 may be used for displaying the shadow image of the rotating outer joint as well as for monitoring and controlling a number of system parameters via menu screen as further described below. The personal computer 29 may provide laser power supply 35 control, system parameter control, welding parameter control, motion control, part handling, database management and system diagnostics, for example, as would be readily appreciated by those skilled in the art.

The laser beam 16 may be positioned to impinge the rotating joint some distance below the apex of the arbor 12 and the diaphragms 14 to avoid glare into the camera 17 from the light produced by welding. In addition, a second vision camera 28 may be used to further monitor and track weld quality. The vision camera 28 directly views the rotating outer joint through the schematically illustrated mirror 30. The image may be processed by the illustrated vision processor 31 and shown on the illustrated display 33. The weld image from this vision camera 28 may be monitored by an operator, or the processor 22 may use the image to control power delivered to the laser 15 by the illustrated laser power supply 35 according to a closed loop control algorithm as will be readily appreciated by those skilled in the art.

The apparatus 10 may also include indexing means for axially positioning the arbor 12 to present a plurality of successive outer joints to the laser beam 16. Accordingly, the indexing means may step through each of the outer joints to be welded for the bellows. In addition, the spacing between the laser beam steering device 25 and the outer joints may be controlled to thereby effect laser focus and also account for different sized diaphragms 14. In one embodiment, the laser 15 and its laser beam 16 may be aligned horizontally as schematically illustrated, and the indexing and distance positioning provided by an X-Y table 37 carried by a frame or table 40. The X-Y table 37 may include respective X and Y drive motors 38, 39 as schematically illustrated. The apparatus 10 is also equipped with a light weight lathe on the precision motorized X-Y table 37 for easy and fast movement of the arbor 12. The X-Y table 37 is preferably mounted to the frame 40 which also carries the other components of the apparatus 10. When the arbor 12 is indexed for the next seam, the seam tracker automatically locates the seam and compensates for any position error.

The beam steering means may include means for steering the laser beam 16 to impinge the rotating joint substantially normal thereto, such as within 30 degrees of a mating surface defined between adjacent bellows diaphragms 14a, 14b. Thus, a high quality symmetrical weld may be formed. The beam steering means preferably comprises a galvanometer beam steering device 25, such as a galvanometer and an associated optical element, such as a mirror or prism connected to the galvanometer; and a focusing lens as would be readily understood by those skilled in the art. Such galvanometer beam steering is used in laser marking and certain laser human vision surgical correction systems, for example, and as would be readily understood by those skilled in the art.

The apparatus 10 may also preferably include an inert gas supply 42. The inert gas may be argon, for example. A first tube 43 and associated nozzle 43a delivers the inert gas to shield the outside surface of the weld area. A second tube 44 delivers the inert gas to shield the interior surface of the weld. In addition, the gas nozzle 43a may be a wraparound or multiple outlet nozzle as would be readily appreciated by those skilled in the art.

The apparatus 10 of present invention uses laser welding to overcome the basic limitations of arc welding. Laser welding may improve the welding speed by ten fold compared to conventional arc welding. The roll-over (the rounded width of the weld bead) is either eliminated or minimized for a better performance (more stroke) of the bellows. The performance (leak rate and weld strength) of laser welded metal bellows is also excellent. A cross-section of a high quality laser welded convolution is shown in FIG. 3 illustrating the outer joint weld bead 14c formed between the two convolutions 14a, 14b.

The apparatus 10 of the present invention comprises the above described high fidelity weld seam tracking system including the above described magnified vision system. The apparatus 10 also includes a low inertia beam steering system, a personal computer 29 with interface boards, and control software. The personal computer 29 calculates the distance to move the beam 16 for tracking the seam and sends out signals to the beam steering system to move the laser beam to the desired location.

Figure 4:
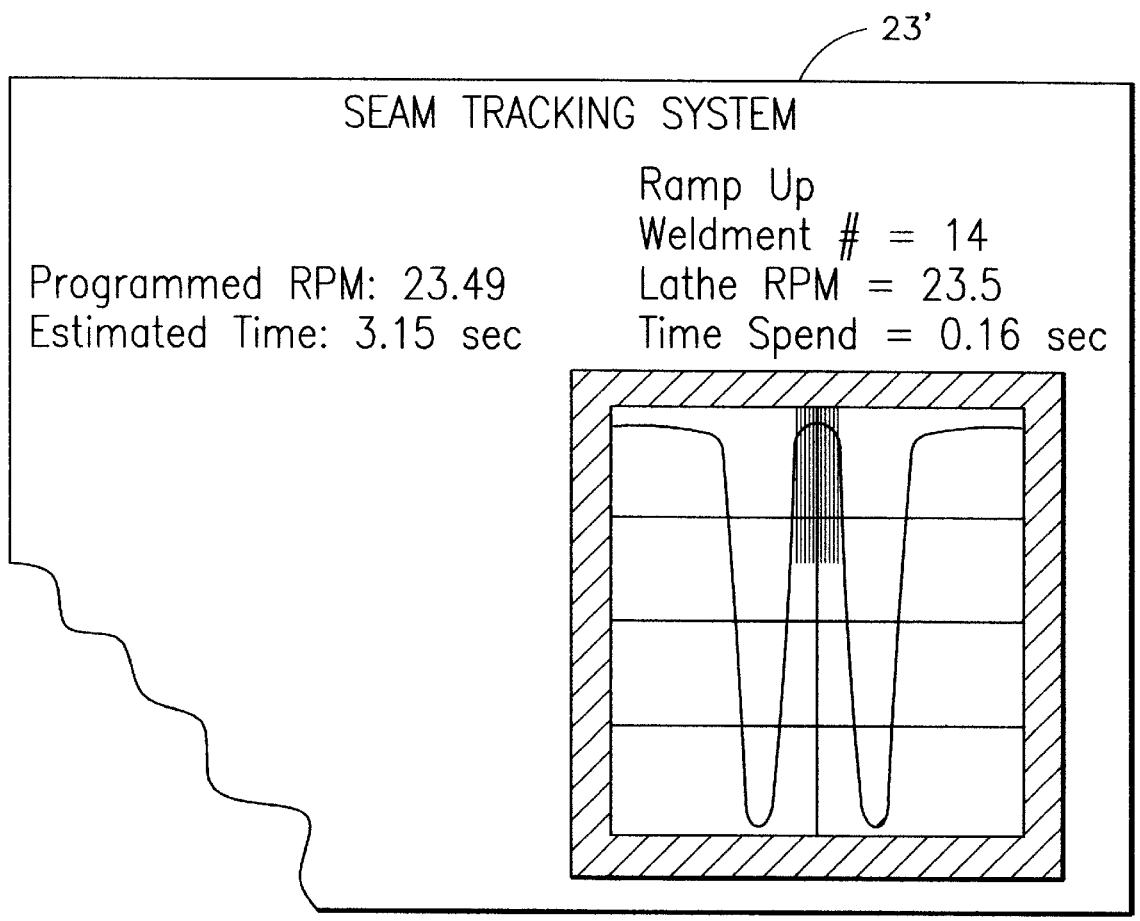
FIG. 4 is a representative display screen of the personal computer of the apparatus as shown in FIG. 1.

The software is preferably menu-driven. Many utility programs may be standard with the apparatus 10 for easy setup. The seam tracker display screen 23' (FIG. 4) shows the images of the weld seam and the position of the laser beam in real time. The center peak image indicates two adjacent diaphragms 14a, 14b. The extended line in the middle of the seam image is the location of the laser beam and the truncated traces show the extent of wobble of the seam. The wobble of the seam may be as much as 0.006" or more. The illustrated display screen 23' also shows the weld number, welding speed (programmed and actual RPM of the arbor and bellows), up-slope, down-slope, estimated time and actual time.

The control software is also menu-driven. The main menu includes; File, Welding, Seam Tracker Calibration, Diagnostics, Log In/Out and Utilities. The File menu allows the user to enter relevant engineering data under the corresponding part number. This database is used to control the laser power, table position, lathe rotation speed (welding speed), shielding gas, power ramp up and down, indexing distance, etc. for a full welding operation of the loaded arbor. Power programming during welding is also available. The data file allows the operator to enter the part number to control all of the necessary welding parameters automatically. A representative display screen 23" is shown in FIG. 5.

The Welding menu has Setup, Run, Dry Run, and Repair options. The Setup option allows the user to operate the apparatus 10 in a semi-manual mode for setting up of welding parameters. The Run option is for automatic production welding. The Dry Run option is a Run option without laser power on to check the welding sequence without actual laser power. The Repair option is for rewelding of certain sections for repair purpose.

The Seam Tracker Calibration menu is for alignment of the laser beam 16 to the workpiece and vision system calibration. The Diagnostics menu allows the user to monitor the status of the system. Log In/Out is for operation by authorized personnel only, and for management report on production status and tracking. Manual table control and other functions are included in Utilities menu.

The low inertia galvanometer beam steering 25 moves very rapidly to deflect the laser beam 16 to the desired position. The deviation of the seam position from the fixed standard position is used to move the laser beam 16 rather than move the parts as in the prior art. This technique allows a smooth and instantaneous response as a result of low inertia of the moving system. The galvanometer based steering may provide a relatively fast response on the order of 3 to 8 ms to move 100 mm. In contrast, a prior art system which relatively moves the parts may take 39 ms to move 100 mm.

The automated laser welding apparatus 10 of the present invention may provide the following benefits for bellows manufacturing as summarized below:

1. Productivity increases—laser welding is five to ten times faster than GTAW, a long training period for skilled operators is not necessary, production capacity is increased considerably, production personnel problems are minimized, and the change over to different diameter bellows (part numbers) is simple and easy.

2. Cost saving—laser welding saves on consumable and labor costs.

3. Quality improvement—weld defects arising from manual tracking can be eliminated, the laser produces consistently high quality welds since there is a no tool (tip) wear, laser welds are stronger than GTAW welds due to less heat input, laser welds have less roll-over, laser welds are cosmetically superior, and testing indicated that laser welded bellows lasted 10 million cycles without failure in a standard life test. The quality of the welds passed or exceeded all of the engineering specifications for the conventional arc welding. Stainless steel diaphragms of 0.004" thick were welded without significant weld roll-over.

A method aspect of the invention is for making a metal bellows of a type comprising a plurality of bellows diaphragms 14 joined together. The method preferably includes the steps of: generating a laser beam 16; rotating a plurality of bellows diaphragms positioned together in side-by-side relation in a path of the laser beam; optically tracking a position of a rotating outer joint of the plurality of bellows diaphragms; and steering the laser beam for welding the rotating outer joint responsive to optically tracking a position of the rotating outer joint. The step of optically tracking preferably comprises capturing an image of the rotating outer joint, and, more preferably comprises providing illumination from an opposite side of the rotating outer joint from the capturing so that the captured image is a shadow image of the rotating outer joint.

Further aspects of forming the inner diameter welds are disclosed in copending patent application entitled "Apparatus and Method for Laser Welding the Inner Joints of Metal Bellows" as referenced above. The inner joint welding is also preferably accomplished by precision laser welding. In addition, many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making a metal bellows of a type comprising a plurality of bellows diaphragms joined together, said apparatus comprising:
    a laser for generating a laser beam;
    an arbor for rotating a plurality of bellows diaphragms positioned together in side-by-side relation adjacent said laser;
    optical tracking means for optically tracking a position of a rotating outer joint of the plurality of bellows diaphragms as said arbor rotates; and
    beam steering means for steering the laser beam for edge welding the rotating outer joint responsive to the optical tracking means such that the laser beam is steered to impinge concurrently on an outer peripheral edge of each of at least a pair of stacked diaphragms.

2. An apparatus according to claim 1 wherein, said optical tracking means comprise an optical sensor to capture an image of the rotating outer joint.

3. An apparatus according to claim 2 wherein said optical tracking means further comprises an illumination source positioned on an opposite side of the rotating outer joint from said sensor so that said sensor captures a shadow image of the rotating outer joint.

4. An apparatus according to claim 2 wherein said sensor comprises a solid state camera.

5. An apparatus according to claim 2 further comprising a processor operatively connected to said optical tracking means and said beam steering means.

6. An apparatus according to claim 5 further comprising a display operatively connected to said processor for displaying the image of the rotating outer joint.

7. An apparatus according to claim 1 further comprising a vision camera positioned to capture the image of the rotating joint after welding and indicative of weld quality.

8. An apparatus according to claim 7 further comprising a processor for controlling laser power responsive to said captured image.

9. An apparatus according to claim 1 wherein said beam steering means comprises means for steering the laser beam to impinge the rotating outer joint within about 30 degrees from a mating surface between adjacent bellows diaphragms.

10. An apparatus according to claim 1 wherein said beam steering means comprises at least one galvanometer and at least one optical element connected thereto.

11. An apparatus according to claim 1 wherein said beam steering means comprises a positionable beam directing head, and a fiber optic cable connected between said positionable beam directing head and said laser.

12. An apparatus according to claim 11 wherein said beam steering means further comprises at least one lens carried by said positionable beam directing head.

13. An apparatus according to claim 1 further comprising indexing means for axially positioning said arbor to present a plurality of successive outer joints to the laser beam.

14. An apparatus according to claim 1 further comprising distance adjusting means for adjustably positioning said arbor relative to said laser for effecting focusing of the laser beam.

15. An apparatus according to claim 1 further comprising:
    a frame;
    laser mounting means for mounting said laser to said frame so that the laser beam is generally horizontally aligned; and
    X-Y positioning means connecting said arbor to said frame for positioning said arbor relative to the laser beam in an X-Y plane.

16. An apparatus according to claim 1 further comprising a supply of inert gas, and delivery means for delivering the inert gas to at least one of an outside weld area and an inside weld area.

17. An apparatus according to claim 1 further comprising a series of spacers positioned between adjacent pairs of diaphragms.

18. An apparatus according to claim 1 wherein said laser comprises one of an Nd:YAG laser, a diode laser, and a carbon dioxide laser.

19. An apparatus according to claim 1 further comprising a processor operatively connected to said laser, said optical tracking means and said beam steering means; and wherein said processor comprises means for storing and recalling information relating to a bellows part designation and welding parameters associated therewith.

20. An apparatus for making a metal bellows of a type comprising a plurality of bellows diaphragms joined together, said apparatus comprising:
    a laser for generating a laser beam;
    an arbor for rotating a plurality of bellows diaphragms positioned together in side-by-side relation adjacent said beam generating means;
    optical tracking means for optically tracking a position of a rotating outer joint of the plurality of bellows diaphragms as said arbor rotates; and at least one galvanometer and associated optical element connected thereto for steering the laser beam for welding the rotating outer joint responsive to the optical tracking means wherein the laser beam is steered to impinge concurrently on an outer peripheral edge of each of at least a pair of said side-by-side diaphragms.

21. An apparatus according to claim 20 wherein said optical tracking means comprises a camera to capture an image of the rotating outer joint.

22. An apparatus according to claim 21 wherein said optical tracking means further comprises an illumination source positioned on an opposite side of the rotating outer joint from said camera so that said camera captures a shadow image of the rotating outer joint.

23. An apparatus according to claim 21 further comprising a processor operatively connected to said optical tracking means and said at least one galvanometer and associated optical element.

24. An apparatus according to claim 23 further comprising a display operatively connected to said processor for displaying the image of the rotating outer joint.

25. An apparatus according to claim 20 further comprising a vision camera positioned to capture the image of the rotating joint after welding and indicative of weld quality.

26. An apparatus according to claim 20 wherein said at least one galvanometer and associated optical element steer the laser beam to impinge the rotating outer joint within about 30 degrees from a mating surface between adjacent bellows diaphragms.

27. An apparatus according to claim 20 further comprising indexing means for axially positioning said arbor to present a plurality of successive outer joints to the laser beam.

28. An apparatus according to claim 20 further comprising distance adjusting means for adjustably positioning said arbor relative to said laser for effecting focusing of the laser beam.

29. An apparatus according to claim 20 further comprising:
   a frame;
   laser mounting means for mounting said laser to said frame so that the laser beam is generally horizontally aligned; and
   X-Y positioning means connecting said arbor to said frame for positioning said arbor relative to the laser beam in an X-Y plane.

30. An apparatus according to claim 20 further comprising a supply of inert gas, and delivery means for delivering the inert gas to at least one of an outside weld area and an inside weld area.

31. An apparatus according to claim 20 further comprising a series of spacers positioned between adjacent pairs of diaphragms.

32. An apparatus according to claim 20 wherein said laser comprises one of an Nd:YAG laser, a diode laser, and a carbon dioxide laser.

33. An apparatus according to claim 20 further comprising a processor operatively connected to said laser, said optical tracking means and said at least one galvanometer; and wherein said processor comprises means for storing and recalling information relating to a bellows part designation and welding parameters associated therewith.

34. An apparatus for making a metal bellows of a type comprising a plurality of bellows diaphragms joined together, said apparatus comprising:
   a frame;
   a laser mounted to said frame for generating a laser beam in one of an X-Y direction;
   an arbor for rotating a plurality of bellows diaphragms positioned together in side-by-side relation adjacent said laser, said arbor being aligned in another of said X-Y direction; and
   X-Y positioning means connecting said arbor to said frame for positioning said arbor relative to the laser beam in an X-Y plane, wherein movement in said another of said X-Y direction axially indexes said arbor to present a plurality of successive outer joints to the laser beam, and wherein movement in said one of said X-Y direction provides adjustment of a spot size of the laser beam, said laser beam impinging on an outer peripheral edge of said bellows joints to effect welding thereof.

35. An apparatus according to claim 34 further comprising:
   optical tracking means for optically tracking a position of a rotating outer joint of the plurality of bellows diaphragms as said arbor rotates; and
   beam steering means for steering the laser beam for welding the rotating outer joint responsive to the optical tracking means.

36. An apparatus according to claim 35 wherein said optical tracking means further comprises an illumination source positioned on an opposite side of the rotating outer joint from an optical sensor so that said sensor captures a shadow image of the rotating outer joint.

37. An apparatus according to claim 35 wherein said beam steering means comprises means for steering the laser beam to impinge the rotating outer joint within about 30 degrees from a mating surface between adjacent bellows diaphragms.

38. An apparatus according to claim 34 further comprising a supply of inert gas, and delivery means for delivering the inert gas to at least one of an outside weld area and an inside weld area.

39. An apparatus according to claim 34 further comprising a series of spacers positioned between adjacent pairs of diaphragms.

40. An apparatus according to claim 34 wherein said laser comprises one of an Nd:YAG laser, a diode laser, and a carbon dioxide laser.

41. An apparatus according to claim 34 further comprising a processor operatively connected to said laser and said X-Y positioning means; and wherein said processor comprises means for storing and recalling information relating to a bellows part designation and welding parameters associated therewith.

42. An apparatus for making a metal bellows of a type comprising a plurality of bellows diaphragms joined together, said apparatus comprising:
   a laser for generating a laser beam;
   an arbor for rotating a plurality of bellows diaphragms positioned together in side-by-side relation adjacent said laser; and
   a processor operatively connected to said laser, said processor comprising means for storing and recalling information relating to a bellows part designation and welding parameters associated therewith, said processor automatically setting the welding parameters in accordance with said recalled information and controlling the laser welding operation to effect welding of said bellows diaphragms.

43. An apparatus according to claim 42 further comprising a vision camera positioned to capture the image of the rotating joint after welding and indicative of weld quality.

44. An apparatus according to claim 42 further comprising a display operatively connected to said processor.

45. An apparatus according to claim 42 further comprising:
optical tracking means for optically tracking a position of a rotating outer joint of the plurality of bellows diaphragms as said arbor rotates; and
beam steering means for steering the laser beam for welding the rotating outer joint responsive to the optical tracking means.

46. An apparatus according to claim 45 wherein said beam steering means comprises means for steering the laser beam to impinge the rotating outer joint within about 30 degrees from a mating surface between adjacent bellows diaphragms.

47. An apparatus according to claim 45 wherein said beam steering means comprises at least one galvanometer and at least one optical element connected thereto.

48. An apparatus according to claim 45 wherein said beam steering means comprises a positionable beam directing head, and a fiber optic cable connected between said positionable beam directing head and said laser.

49. An apparatus according to claim 48 wherein said beam steering means further comprises at least one lens carried by said positionable beam directing head.

50. A method for making a metal bellows of a type comprising a plurality of bellows diaphragms joined together, the method comprising the steps of:
generating a laser beam;
rotating a plurality of bellows diaphragms positioned together in side-by-side relation in a path of the laser beam;
optically tracking a position of a rotating outer joint of the plurality of bellows diaphragms; and
steering the laser beam for welding the rotating outer joint responsive to optically tracking a position of the rotating outer joint such that said laser beam impinges concurrently on an outer peripheral edge of each of at least a pair of side-by-side diaphragms to effect edge welding thereof.

51. A method according to claim 50 wherein the step of optically tracking comprises capturing an image of the rotating outer joint.

52. A method according to claim 51 wherein the step of capturing the image comprises the step of providing illumination from an opposite side of the rotating outer joint from the capturing so that the captured image is a shadow image of the rotating outer joint.

53. A method according to claim 51 further comprising the step of displaying the image of the rotating outer joint.

54. A method according to claim 50 further comprising the steps of capturing and displaying an image of the rotating joint after welding and indicative of weld quality.

55. A method according to claim 50 wherein the step of steering the laser beam comprises steering the laser beam to impinge the rotating outer joint within about 30 degrees from a mating surface between adjacent bellows diaphragms.

56. A method according to claim 50 further comprising the step of presenting a plurality of successive outer joints to the laser beam.

57. A method according to claim 50 further the step of adjustably positioning the outer joint to the laser for effecting focusing of the laser beam.

58. A method according to claim 50 further comprising the step of supplying an inert gas to at least one of an outside weld area and an inside weld area.

59. A method according to claim 50 further comprising the step of positioning a series of spacers between adjacent pairs of diaphragms.

60. A method for welding outer peripheral edges of adjacent stacked metal diaphragms, the method comprising the steps of:
developing a set of desired welding parameters for each of a plurality of different types of metal diaphragms, the parameters including at least a diameter of each diaphragm, laser welding power, and a welding speed;
storing the set of welding parameters in a database wherein the set of parameters is accessible by entry of a diaphragm identifier;
positioning a stack of diaphragms in side-by-side relationship in preparation for welding;
aligning a laser for generating a laser beam for impinging on the stack of diaphragms; and
providing a programmable controller operably coupled to the laser and responsive to the stored parameters for controlling operation of the laser to effect welding of the outer peripheral edges of selected adjacent diaphragms by inputting the diaphragm identifier to retrieve the corresponding stored parameters from the database.

61. The method of claim 60 wherein the step of aligning the laser including the step of positioning the laser to direct the laser beam to impinge concurrently on the outer peripheral edges of adjacent diaphragms to be welded.

* * * * *